United States Patent
Takase et al.

(10) Patent No.: US 7,727,606 B2
(45) Date of Patent: Jun. 1, 2010

(54) POLYLACTIC ACID RESIN FOAMED MOLDING AND PROCESS FOR MANUFACTURING THE SAME

(75) Inventors: Kenichi Takase, Kanuma (JP); Masayasu Okuda, Kanuma (JP); Masato Naito, Kanuma (JP)

(73) Assignee: JSP Corporation, Tokyo (JP)

(*) Notice: Subject to any disclaimer, the term of this patent is extended or adjusted under 35 U.S.C. 154(b) by 454 days.

(21) Appl. No.: 11/255,620

(22) Filed: Oct. 21, 2005

(65) Prior Publication Data

US 2006/0091576 A1 May 4, 2006

(30) Foreign Application Priority Data

Nov. 2, 2004 (JP) ............... 2004-319627

(51) Int. Cl.
- B65D 39/00 (2006.01)
- C08J 9/00 (2006.01)
- B29D 7/00 (2006.01)
- B29C 45/00 (2006.01)
- B29C 47/00 (2006.01)
- B29C 45/14 (2006.01)
- B32B 37/00 (2006.01)

(52) U.S. Cl. ............. 428/36.5; 521/79; 264/45.9; 264/512; 264/513; 264/514; 264/515

(58) Field of Classification Search ........... 428/36.4, 428/36.5; 521/79; 264/45.9, 512–515
See application file for complete search history.

(56) References Cited

U.S. PATENT DOCUMENTS 5,594,095 A * 1/1997 Gruber et al. ............... 528/354
5,702,787 A 12/1997 Anderson et al.
6,294,115 B1 * 9/2001 Blizard et al. ............... 264/45.9
6,344,493 B2 * 2/2002 Koshirai et al. ............. 521/42.5
2003/0124334 A1 * 7/2003 Naito et al. ............... 428/314.8

FOREIGN PATENT DOCUMENTS

| EP | 1072389 A1 | 1/2001 |
| EP | 1075933 A1 | 2/2001 |
| EP | 1378538 A1 | 1/2004 |
| JP | 2000-136259 A | 5/2000 |
| JP | 2002-3709 A | 1/2002 |
| JP | 2002-322309 A | 11/2002 |
| JP | 2003-183433 | 7/2003 |

OTHER PUBLICATIONS

European Search Report for EP-05023248 (Dec. 18, 2007).

* cited by examiner

*Primary Examiner*—Rena L Dye
*Assistant Examiner*—James Yager
(74) *Attorney, Agent, or Firm*—Knoble, Yoshida & Dunleavy, LLC

(57) ABSTRACT

A polylactic acid resin foamed molding obtained by placing in a mold a cylindrical body having a foamed layer, which is formed by extruding a foamable molten resin composition prepared by kneading together a polylactic acid resin and a physical blowing agent from a die into a low-pressure zone, and molding it, wherein
the molding's foamed layer constituting the foamed molding has a difference ($\Delta H_{endo:2° C./min} - \Delta H_{exo:2° C./min}$) between the endothermic calorific value ($\Delta H_{endo:2° C./min}$) and the exothermic calorific value ($\Delta H_{exo:2° C./min}$) obtained by heat flux differential scanning calorimetry (heating rate of 2° C./min) of 10 J/g or more and a melt tension at 190° C. of 2 cN or more.

3 Claims, 9 Drawing Sheets

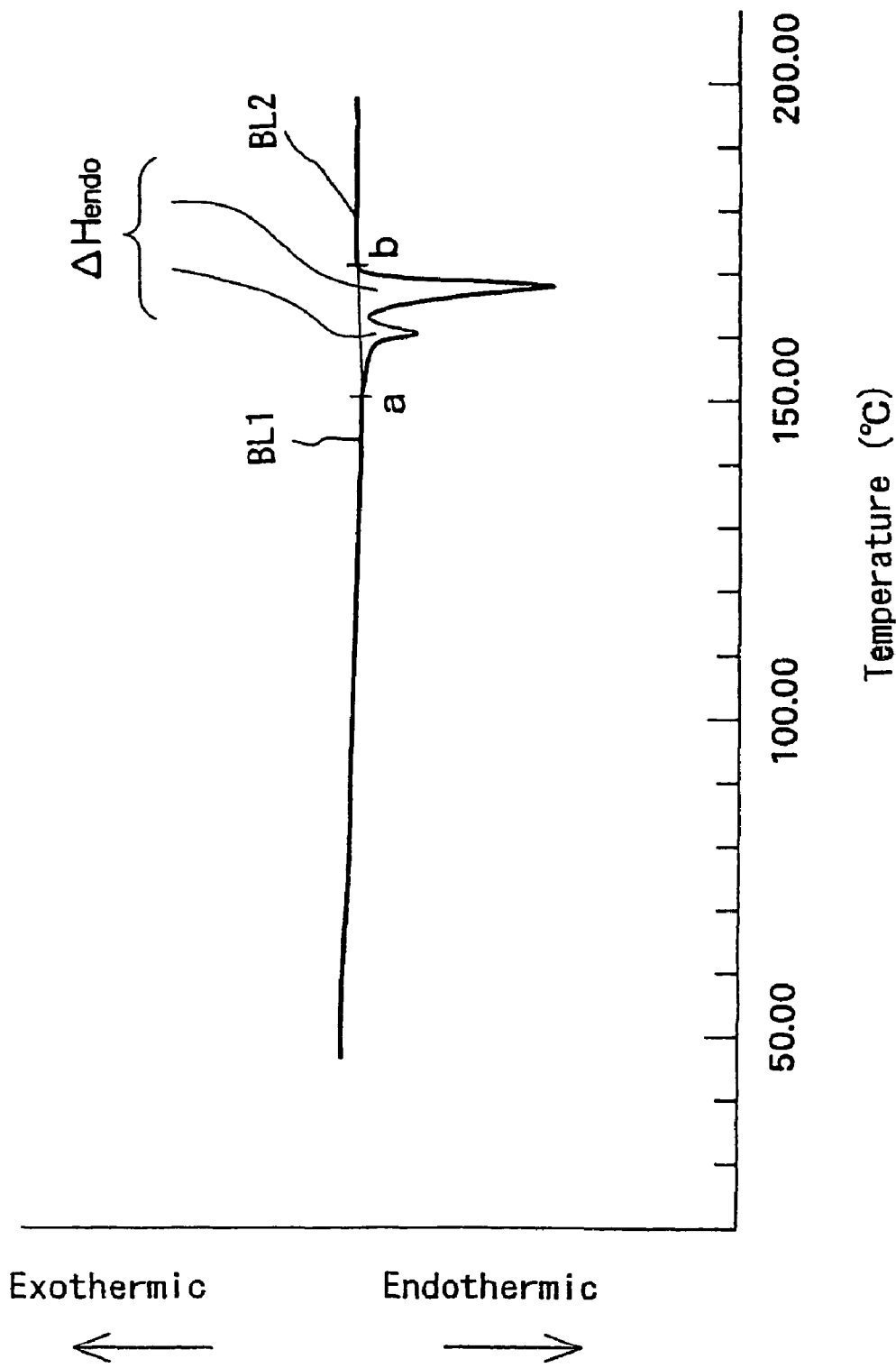

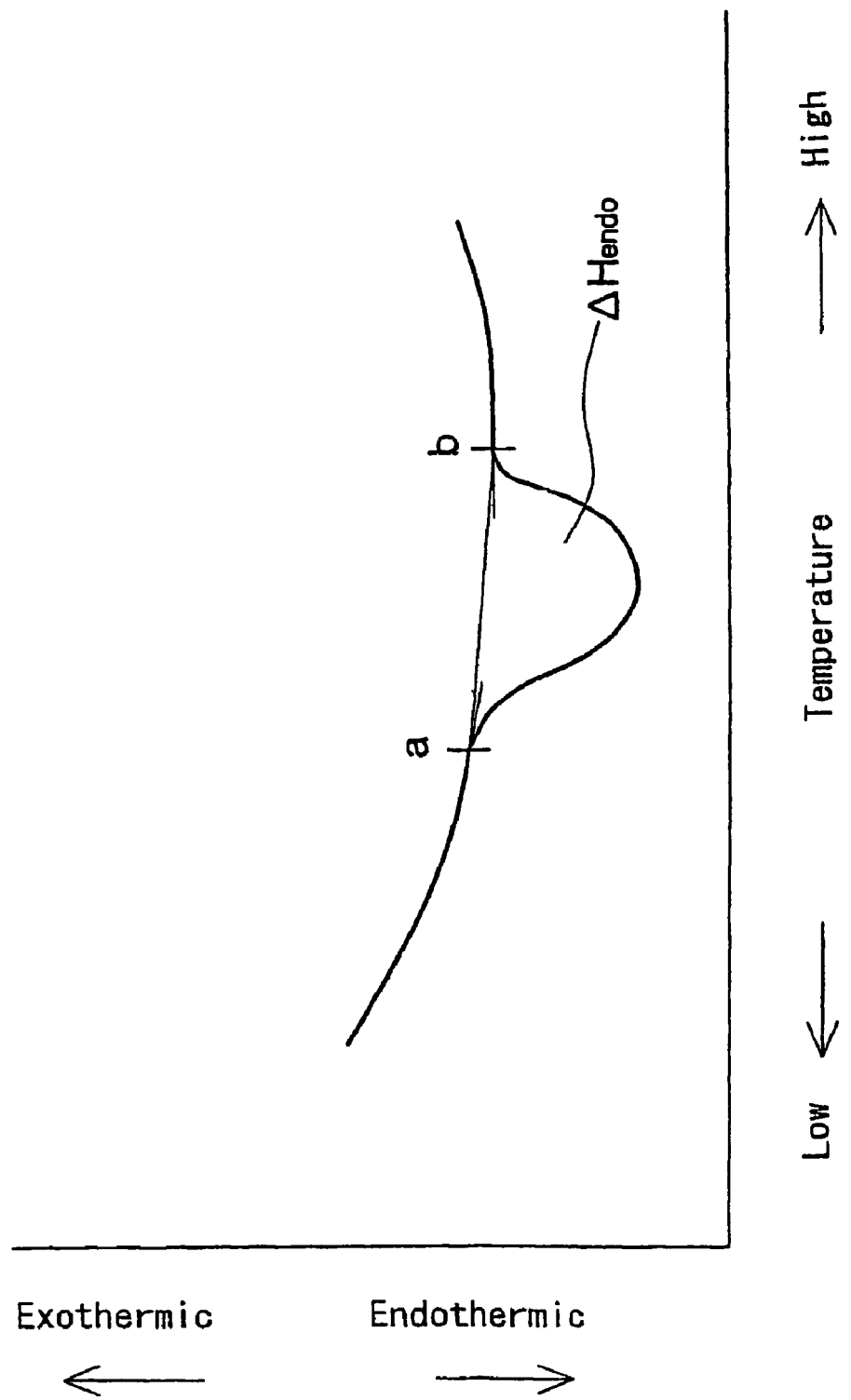

US 7,727,606 B2

POLYLACTIC ACID RESIN FOAMED MOLDING AND PROCESS FOR MANUFACTURING THE SAME

TECHNICAL FIELD

The present invention relates to a polylactic acid resin foamed molding manufactured by placing a cylindrical body having a foamed layer in a mold and molding it and to a manufacturing process thereof.

The disclosure of Japanese Patent Application No. 2004-319627 filed Dec. 2, 2004 including specification, drawings and claims is incorporated herein by reference in its entirety.

BACKGROUND OF THE INVENTION

Heretofore, as one of the processes for molding a thermoplastic resin, there has been known a process for manufacturing a molding by placing a cylindrical body having a foamed layer (may be referred to as "foamed parison" hereinafter), which is formed by melt kneading together a resin and a blowing agent in an extruder and extruding the resulting melt from a die, in a mold and molding it.

For the above process for manufacturing a molding, general-purpose resins such as polyethylene resin, polypropylene resin and polystyrene resin have been studied.

Meanwhile, under such a situation that people's awareness of global environment is getting deeper and deeper and environmental problems such as the exhaustion of oil resources are now in the spotlight, polylactic acid resins derived from corn etc. are attracting attention in place of the above conventional general-purpose resins derived from oil resources. In expectation of the increasing general applicability of the polylactic acid resins in the future, the development of foams obtained from the polylactic acid resins is now under way.

However, as for polylactic acid resin foams, technologies related to foamed sheets are already disclosed by JP-A-2002-322309, JP-A-2002-3709, JP-A-2000-246259, etc. whereas the development of a polylactic acid resin molding obtained by placing a foamed parison of a polylactic acid resin in a mold is not under way.

SUMMARY OF THE INVENTION

It is an object of the present invention to provide a hollow or solid polylactic acid resin foamed molding obtained by placing a foamed parison in a mold and molding it (maybe referred to as "foamed parison molding" hereinafter) and a manufacturing process thereof.

According to the present invention, there is provided a polylactic acid resin foamed molding obtained by placing in a mold a cylindrical body having a foamed layer, which is formed by extruding a foamable molten resin composition prepared by kneading together a polylactic acid resin and a physical blowing agent from a die into a low-pressure zone, and molding it, wherein the molding's foamed layer constituting the foamed molding has a difference ($\Delta H_{endo:2° C./min} - \Delta H_{exo:2° C./min}$) between the endothermic calorific value ($\Delta H_{endo:2° C./min}$) and the exothermic calorific value ($\Delta H_{exo:2° C./min}$) obtained by heat flux differential scanning calorimetry (heating rate of 2° C./min) of 10 J/g or more and a melt tension at 190° C. of 2 cN or more (Embodiment-I).

Further, according to the present invention, there is provided a process for manufacturing a polylactic acid resin foamed molding by placing in a mold a cylindrical body having a foamed layer, which is formed by extruding a foamable molten resin composition prepared by kneading together a polylactic acid resin and a physical blowing agent in an extruder from a die into a low-pressure zones wherein the polylactic acid resin has a melt tension at 190° C. of 3 cN or more, a water content of 300 ppm or less and an exothermic calorific value ($\Delta H_{exo:-10° C./min}$) obtained by heat flux differential scanning calorimetry (cooling rate of 10° C./min) of 20 J/g or more (Embodiment-II).

Further, according to the present invention, there is provided a process for manufacturing a polylactic acid resin foamed molding, comprising the steps of feeding 100 parts by weight of a polylactic acid resin having a water content of 300 ppm or less and an endothermic calorific value ($\Delta H_{endo:row}$) obtained by heat flux differential scanning calorimetry (heating rate of 2° C./min) of 10 J/g or more and 0.1 to 1 part by weight of an organic peroxide to an extruder to heat and knead them together so as to obtain a molten resin composition, injecting a physical blowing agent into the extruder to knead it with the molten resin composition so as to obtain a foamable molten resin composition, extruding the foamable molten resin composition from a die into a low-pressure zone to form a cylindrical body having a foamed layer, and placing the cylindrical body in a mold and molding it (Embodiment-III).

BRIEF DESCRIPTION OF THE DRAWINGS

FIG. 2 is a graph of a DSC curve showing $\Delta H_{endo:row}$ of a polylactic acid resin obtained by heat flux differential scanning calorimetry;

FIG. 3 is a graph of another DSC curve showing $\Delta H_{endo:row}$ of a polylactic acid resin obtained by heat flux differential scanning calorimetry;

DETAILED DESCRIPTION OF THE PREFERRED EMBODIMENT

The polylactic acid resin foamed molding and the process for manufacturing a polylactic acid resin foamed molding of the present invention will be described in detail hereinunder.

The polylactic acid resin foamed molding (may be simply referred to as "foamed molding" hereinafter) of the present invention is a foamed molding having a foamed layer, which is obtained by extruding a foamable molten resin composition prepared by kneading together a polylactic acid resin and a physical blowing agent from a die into a low-pressure zone to form a cylindrical body having a foamed layer and placing the cylindrical body in a mold to mold it.

In the following description, the foamed layer constituting the foamed molding may be expressed as "molding's foamed layer" and the foamed layer constituting the cylindrical body formed by extruding the above composition from the die into the low-pressure zone may be expressed as "cylindrical body's foamed layer".

Figure 1A:
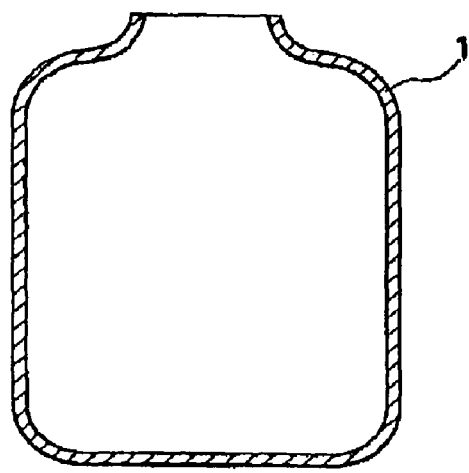
FIGS. 1(a) to 1(d) are longitudinal sectional views of foamed moldings having a hollow portion therein.
Figure 1B:
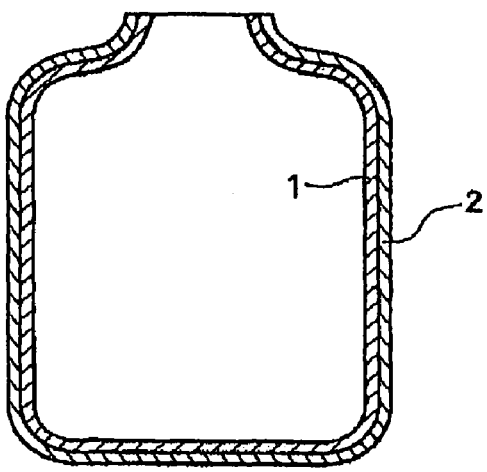
Figure 1C:
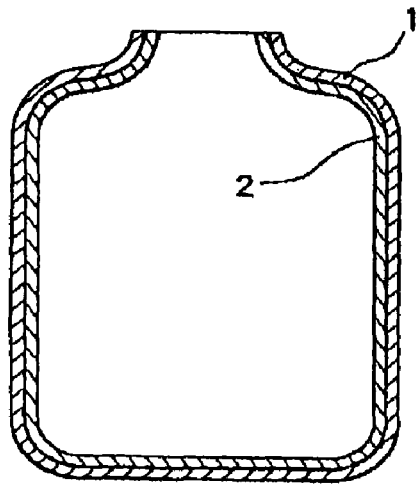
Figure 1D:
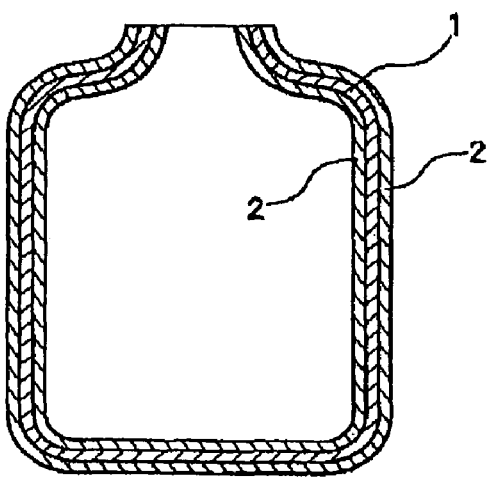
Figure 9A:
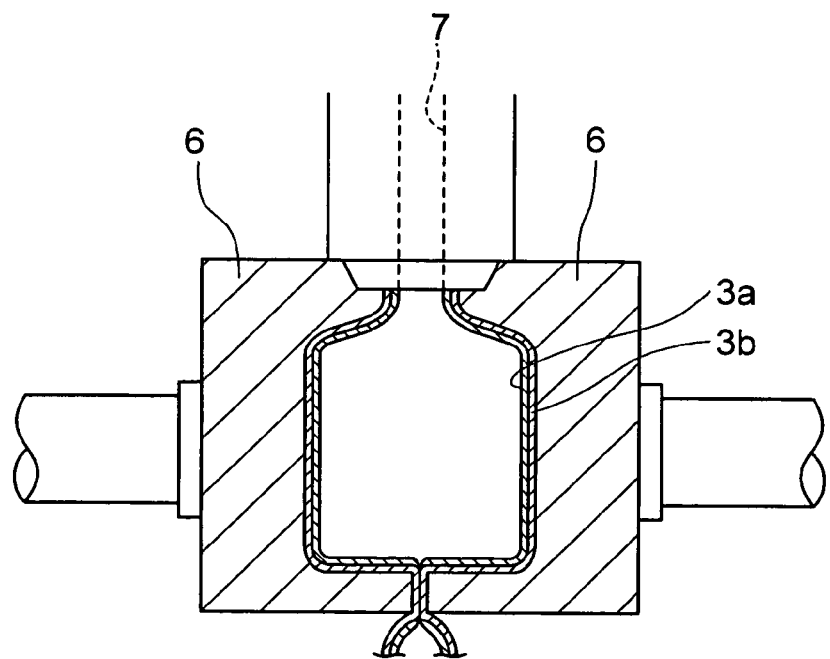
FIG. 9(a) is a diagram conceptually showing an example of a process for molding a foamed molding having a hollow portion by placing a foamed parison in the present invention in a mold and FIG. 9(b) is a diagram conceptually showing an example of a process for molding a foamed molding having no hollow portion by placing a foamed parison in the present invention in a mold.
Figure 9B:
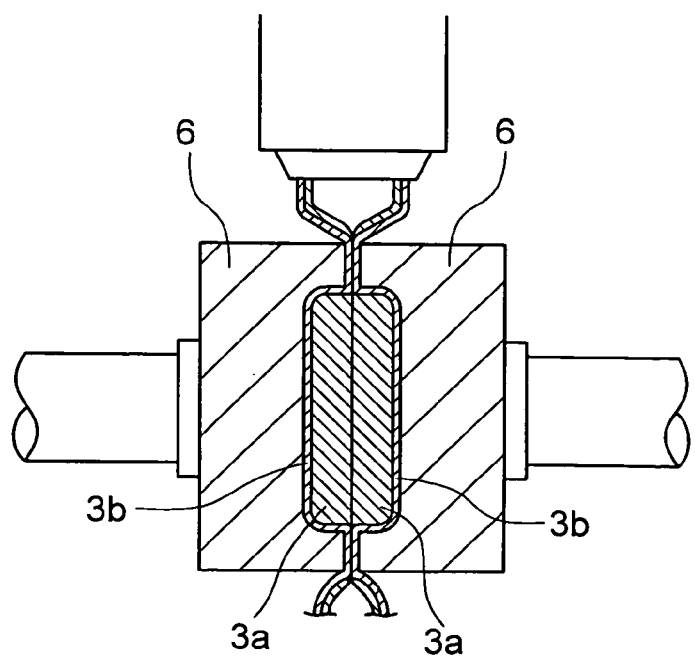

The foamed molding of the present invention is formed by foamed parison molding and is a plate-like foamed molding having no hollow portion as shown in FIG. 9(b) or a foamed molding having a hollow portion therein as shown in FIGS. 1(a) to 1(d) and FIG. 9(a). Examples of the foamed molding having a hollow portion therein include a molding composed of only a molding's foamed layer as shown in FIG. 1(a), a molding having an non-foamed resin layer as a layer on the outer side of the molding's foamed layer as shown in FIG. 1(b), a molding having an non-foamed resin layer as a layer on the inner side of the molding's foamed layer as shown in FIG. 1(c), and a molding having non-foamed resin layers as layers on the outer side and inner side of the molding's foamed layer as shown in FIG. 1(d).

The molding's foamed layer may consist of two or more layers, and the non-foamed resin layer may consist of two or more layers.

FIGS. 1(a), 1(b), 1(c) and 1(d) are longitudinal sectional views of foamed moldings having a hollow portion therein. Reference numeral 1 denotes the molding's foamed layer and 2 denotes the non-foamed resin layer.

The cylindrical body's foamed layer and the molding's foamed layer of the present invention comprise a polylactic acid resin as the main ingredient. That is, the main ingredient of a base resin constituting these foamed layers is a polylactic acid resin. The term "polylactic acid resin" as used herein is intended to refer to a polymer having a structural unit containing 50 mol % or more of a structural unit derived from lactic acid. Examples of the polylactic acid resin include (1) a homopolymer of lactic acid, (2) a copolymer of lactic acid with other aliphatic hydroxycarboxylic acid, (3) a copolymer of lactic acid with an aliphatic polyhydric alcohol and an aliphatic polycarboxylic acid, (4) a copolymer of lactic acid with an aliphatic polycarboxylic acid, (5) a copolymer of lactic acid with an aliphatic polyhydric alcohol, (6) a mixture of two or more of (1) to (5). Examples of the above lactic acid include L-lactic acid, D-lactic acid, DL-lactic acid, cyclic dimers thereof such as L-lactide, D-lactide, DL-lactic, and a mixture thereof.

Among the above polylactic acid resins, the polylactic acid resin used in the present invention has an endothermic calorific value ($\Delta H_{endo:row}$) obtained by the following heat flux differential scanning calorimetry of 10 J/g or more, preferably 20 J/g or more, more preferably 30 J/g or more. The upper limit of the endothermic calorific value ($\Delta H_{endo:row}$) of the polylactic acid resin used in the present invention is not particularly limited but is generally 65 J/g. As the polylactic acid resin having an endothermic calorific value ($\Delta H_{endo:row}$) of 10 J/g or more used in the present invention, a polylactic acid resin having an endothermic calorific value ($\Delta H_{endo:row}$) of 10 J/g or more is selected from among crystalline polylactic acid resins and mixtures of a crystalline polylactic acid resin and a noncrystalline polylactic acid resin-based resin.

The term "crystalline polylactic acid resin" as used herein means a crystalline polylactic acid resin having an endothermic calorific value $\Delta H_{endo:row}$ defined hereinabove of more than 2 J/g. The endothermic calorific value $\Delta H_{endo:row}$ of the crystalline polylactic acid resin is generally 20 to 65 J/g. The term "noncrystalline polylactic acid resin" as used herein means a noncrystalline polylactic acid resin which has an endothermic calorific value ($\Delta H_{endo:row}$) defined hereinabove of 2 J/g or less and shows an endothermic peak or no endothermic peak.

The endothermic calorific value ($\Delta H_{endo:row}$) of the above polylactic acid resin is obtained by heat flux differential scanning calorimetry in accordance with JIS K7122-1987. 1 to 4 mg of a polylactic acid resin is used as a sample, and the control of the state of the sample and the measurement of a DSC curve are carried out by the following procedures.

The sample is placed in the vessel of a DSC apparatus, heated to 200° C. to be molten, kept at that temperature for 10 minutes, cooled to 125° C. at a cooling rate of 2° C./min, kept at that temperature for 120 minutes and further cooled to 40° C. at a cooling rate of 2° C./min. After the above heat treatment, the sample is heated again to a temperature about 30° C. higher than the temperature at the end of a melting peak at a heating rate of 2° C./min to be molten so as to obtain a DSC curve.

In the present invention, as shown in FIG. 2, the endothermic calorific value ($\Delta H_{endo:row}$) of the polylactic acid resin is a value obtained from the area of a portion defined by the DSC curve and a straight line connecting a point "a" where an endothermic peak of the DSC curve begins to separate from the low temperature-side base line and a point "b" where an endothermic peak returns to the high temperature-side base line. The apparatus is adjusted to make the base line as straight as possible. However, when the base line is inevitably curved, as shown in FIG. 3, a point where an endothermic peak begins to separate from the curved base line on the low temperature side is taken as the point "a" and a point where the endothermic peak returns to the curved base line on the high temperature side is taken as the point "b".

In the measurement of the above endothermic calorific value ($\Delta H_{endo:row}$), the reason that keeping the sample at 125° C. for 120 minutes, a cooling rate of 2° C./min and a heating rate of 2° C./min are employed as conditions for the control of the state of the sample and the measurement of the DSC curve is that the crystallization of the polylactic acid resin sample is promoted as much as possible to measure the endothermic calorific value ($\Delta H_{endo:row}$) of the polylactic acid resin which has been crystallized completely or nearly completely.

The molding's foamed layer constituting the foamed molding of the present invention comprises a polylactic acid resin as the main ingredient of its base resin. This means that 100 wt % of the above polylactic acid resin or a mixture of 50 wt % or more and less than 100 wt % of the above polylactic acid resin and more than 0 wt % and 50 wt % or less of a thermoplastic resin other than the above polylactic acid resin is used as the base resin. That is, in the present invention, a thermoplastic resin other than the above polylactic acid resin can be mixed into the base resin of the foamed layer in an amount of 50 wt % or less as far as the object and effect of the present invention can be attained. When a thermoplastic resin other than the above polylactic acid resin is contained in the base resin, the base resin contains the above polylactic acid resin in an amount of preferably 70 wt % or more, more preferably 90 wt % or more. Examples of the thermoplastic resin other than the polylactic acid resin include polyethylene resins, polypropylene resins, polystyrene resins and polyester resins. Among these, biodegradable aliphatic polyester resins containing at least 35 mol % of an aliphatic ester component unit are preferred. In this case, the aliphatic polyester resins include hydroxy acid polycondensates other than the above polylactic acid resin, ring-opening polymers of lactone such as polycaprolactone, and polycondensates of an aliphatic polyhydric alcohol and an aliphatic polycarboxylic acid such as polybutylene succinate, polybutylene adipate, polybutylene succinate adipate and poly(butylene adipate/terephthalate).

The polylactic acid resin used in the present invention may be prepared by any suitable known method such as a method in which lactic acid or a mixture of lactic acid and an aliphatic hydroxycarboxylic acid is directly subjected to dehydration polycondensation (disclosed, for example, in U.S. Pat. No. 5,310,865), a ring-opening polymerization method in which a cyclic dimer of lactic acid (lactide) is polymerized (disclosed, for example, in U.S. Pat. No. 2,758,987), a ring-opening polymerization method in which cyclic dimmers of lactic acid and an aliphatic hydroxycarboxylic acid such as lactide and glycolide are polymerized with ε-caprolactone in the presence of a catalyst (disclosed, for example, in U.S. Pat. No. 4,057,537), a method in which a mixture of lactic acid, an aliphatic dihydric alcohol and an aliphatic dibasic acid is directly subjected to dehydration polycondensation (disclosed, for example, in U.S. Pat. No. 5,428,126), a method in which a lactic acid polymer, an aliphatic dihydric alcohol, an aliphatic dibasic acid and a polymer are subjected to condensation in the presence of an organic solvent (disclosed, for example, in EP-A-0712880 A2), and a method in which lactic acid is subjected to dehydration polycondensation in the presence of a catalyst for the manufacture of a polyester polymer with a step of polymerization in a solid phase being involved during the course of the polymerization. The above methods may be carried out in the presence of a small amount of an aliphatic polyhydric alcohol such as glycerin, an aliphatic polybasic acid such as butanetetracarboxylic acid or polyhydric alcohol polysaccharide.

When the molding's foamed layer is made of a noncrystalline polylactic acid resin, it is one of comparative examples to the present invention. In this case, a noncrystalline polylactic acid resin is used as the base resin and foamed by the foamed parison molding, and the obtained cylindrical body is placed in a mold and molded to form a molding's foamed layer having a low apparent density. However, when the temperature of the noncrystalline polylactic acid resin exceeds its glass transition point, its rigidity sharply degrades, whereby the obtained foamed molding cannot retain a fixed shape. Therefore, the foamed molding does not have heat resistance high enough to stand practical use. In contrast to this, when a polylactic acid resin having an endothermic calorific value ($\Delta H_{endo:row}$) obtained by heat flux differential scanning calorimetry of 10 J/g or more is used as the polylactic acid resin constituting the main ingredient of the base resin of the foamed layer, foamability, moldability and the heat resistance of the polylactic acid resin foamed molding can be achieved at the same time by controlling its crystal state.

(I) Foamed Molding (i) Embodiment-I

The difference ($\Delta H_{endo:2° C./min}$−$\Delta H_{exo:2° C./min}$) between the endothermic calorific value ($\Delta H_{endo:2° C./min}$) and the exothermic calorific value ($\Delta H_{exo:2° C./min}$) obtained by heat flux differential scanning calorimetry (heating rate of 2° C./min) of the molding's foamed layer of the foamed molding in Embodiment-I of the present invention is 10 J/g or more.

The term "exothermic calorific value ($\Delta H_{exo:2° C./min}$)" as used herein means the amount of heat generated when the crystallization of a sample is promoted by heat flux differential scanning calorimetry at a heating rate of 2° C./min.

The molding's foamed layer of which crystallization proceeds at higher rates has the smaller exothermic calorific value ($\Delta H_{exo:2° C./min}$).

The term "endothermic calorific value ($\Delta H_{endo:2° C./min}$)" as used herein means the amount of heat of fusion when the crystals of a sample are fused by heat flux differential scanning calorimetry at a heating rate of 2° C./min. As the endothermic calorific value ($\Delta H_{endo:2° C./min}$) becomes larger, the crystallization of the molding's foamed layer can be enhanced, thereby improving rigidity and heat resistance.

The difference ($\Delta H_{endo:2° C./min}$−$\Delta H_{exo:2° C./min}$) between the endothermic calorific value and the exothermic calorific value corresponds to the amount of heat of fusion required for the fusion of the crystals of the sample used for heat flux differential scanning calorimetry when it is set in the calorimeter. As this value becomes larger, the crystallization of the molding's foamed layer proceeds more, which means that a foamed molding having a molding's foamed layer with excellent rigidity and heat resistance is obtained.

From this point of view, the difference ($\Delta H_{endo:2° C./min}$−$\Delta H_{exo:2° C./min}$) is preferably 15 J/g or more, more preferably 20 J/g or more, particularly preferably 30 J/g or more. Since the upper limit of the endothermic calorific value of the crystalline polylactic acid resin is generally 65 J/g as described above, the difference ($\Delta H_{endo:2° C./min}$−$\Delta H_{exo:2° C./min}$) does not exceed 65 J/g.

In the present invention, the exothermic calorific value ($\Delta H_{exo:2° C./min}$) and the endothermic calorific value ($\Delta H_{endo:2° C./min}$) of the molding's foamed layer are obtained by heat flux differential scanning calorimetry in accordance with JIS K7122-1987. 1 to 4 mg of a foam piece cut out from the molding's foamed layer is used as a sample, and the control of the state of the sample and the measurement of the DSC curve are carried out by the following procedures.

The sample is placed into the vessel of a DSC apparatus, not subjected to a heat treatment, and heated to a temperature about 30° C. higher than the temperature at the end of a melting peak at a heating rate of 2° C./min to be molten so as to obtain a DSC curve. The exothermic calorific value ($\Delta H_{exo:2° C./min}$) of the molding's foamed layer is a value obtained from the area of a portion defined by the DSC curve and a straight line connecting a point "c" where the exothermic peak of the DSC curve begins to separate from the low temperature-side base line and a point "d" where the exothermic peak returns to the high temperature-side base line. The endothermic calorific value ($\Delta H_{endo:2° C./min}$) of the molding's foamed layer is a value obtained from the area of a portion defined by the DSC curve and a straight line connecting a point "e" where the endothermic peak of the DSC curve begins to separate from the low temperature-side base line and a point "f" where the endothermic peak returns to the high temperature-side base line. The apparatus is adjusted to make the base line of the DSC curve as straight as possible. When the base line is inevitably curved, a point where the exothermic peak begins to separate from the curved base line on the low temperature side is taken as the point "c", a point where the exothermic peak returns to the curved base line on the high temperature side is taken as the point "d", or a point where the endothermic peak begins to separate from the curved base line on the low temperature side is taken as the point "e" and a point where the endothermic peak returns to the curved base line on the high temperature side is taken as the point "f".

Figure 4:
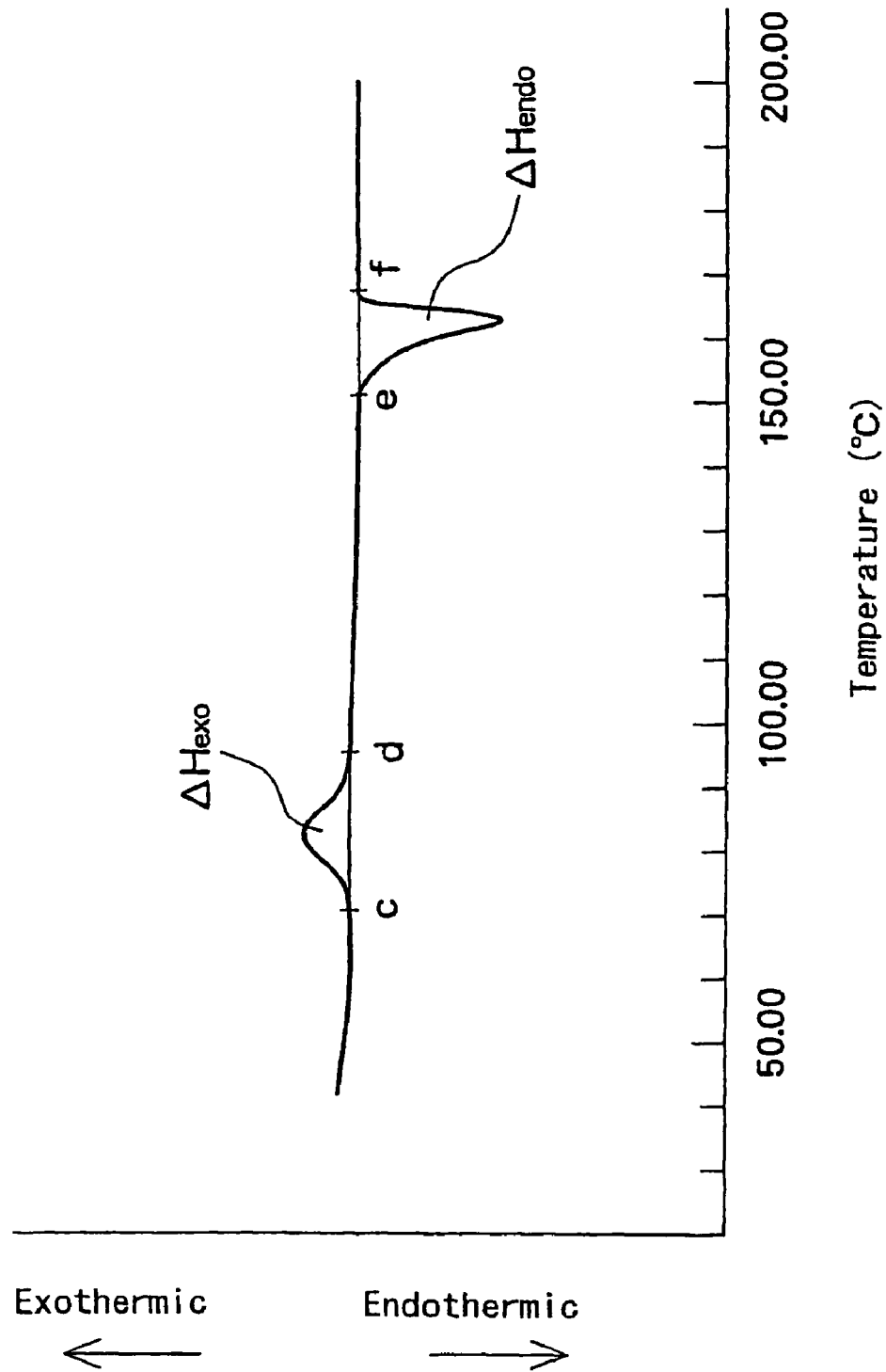
FIG. 4 is a graph of a DSC curve showing $\Delta H_{exo:2° C./min}$ and $\Delta H_{endo:2° C./min}$ of a molding's foamed layer obtained by heat flux differential scanning calorimetry.
Figure 5:
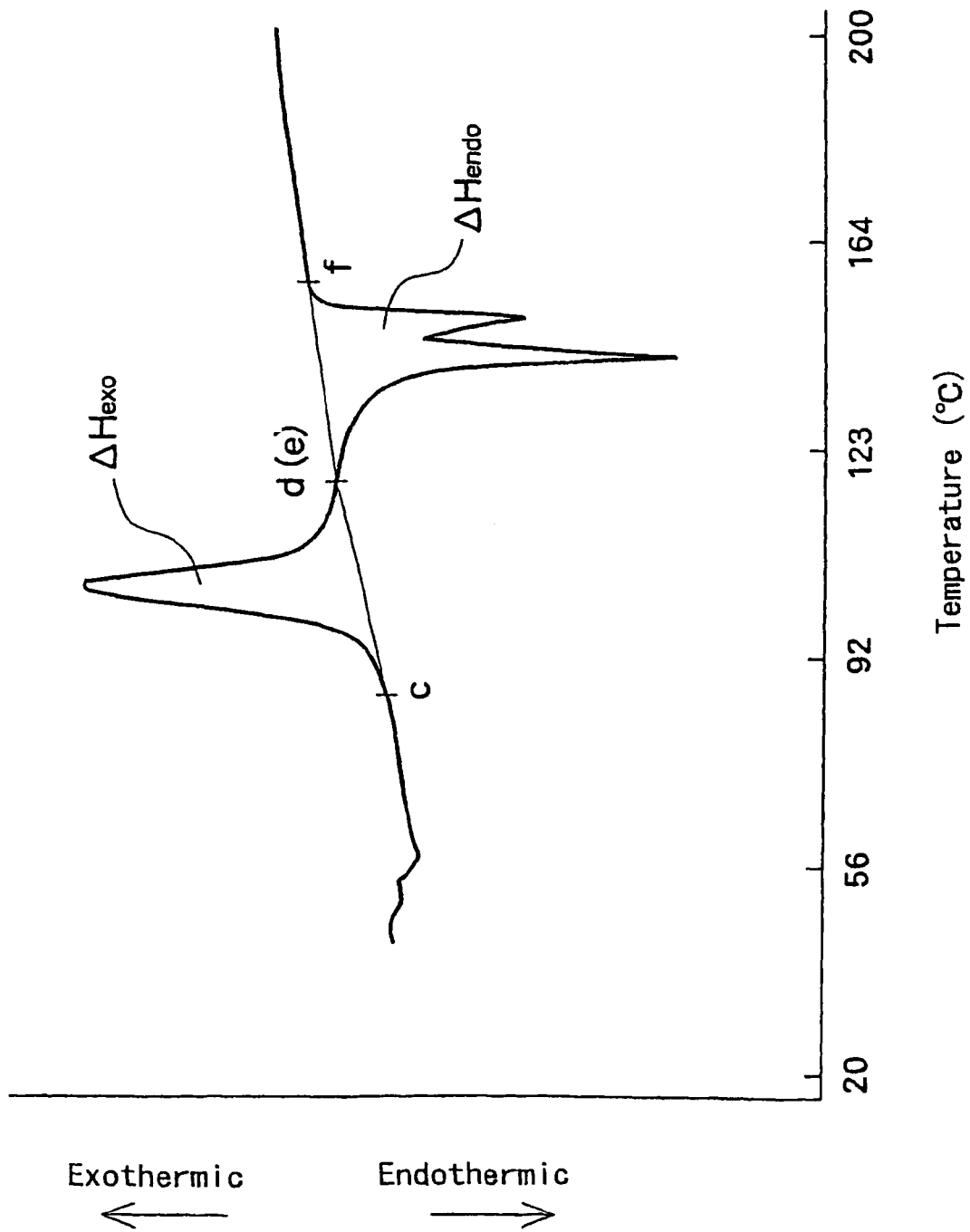
FIG. 5 is a graph of another DSC curve showing $\Delta H_{exo:2° C./min}$ and $\Delta H_{endo:2° C./min}$ of a molding's foamed layer obtained by heat flux differential scanning calorimetry.
Figure 6:
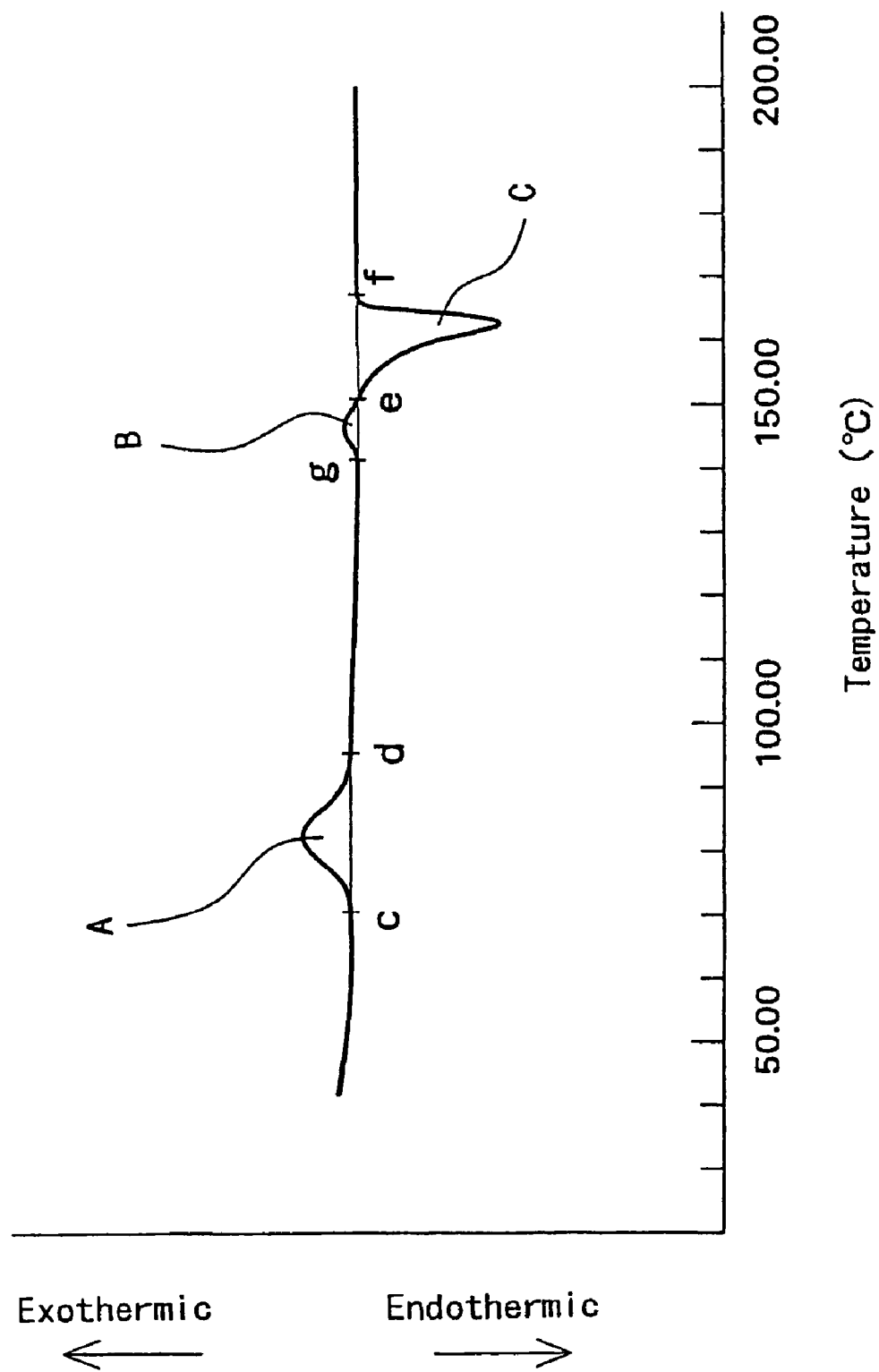
FIG. 6 is a graph of still another DSC curve showing $\Delta H_{exo:2° C./min}$ and $\Delta H_{endo:2° C./min}$ of a molding's foamed layer obtained by heat flux differential scanning calorimetry.

For example, in FIG. 4, the exothermic calorific value ($\Delta H_{exo:2° C./min}$) of the molding's foamed layer is obtained from the area of a portion defined by the DSC curve and the straight line connecting the points "c" and "d" specified as described above and the endothermic calorific value ($\Delta H_{endo:2°\ C./min}$) of the molding's foamed layer is obtained from the area of a portion defined by the DSC curve and the straight line connecting the points "e" and "f" specified as described above. Since it is difficult to specify the points "d" and "e" by the above method in the case shown in FIG. 5, the intersection between the straight line connecting the points "c" and "f" specified as described above and the DSC curve is taken as the point "d" ("e") to obtain the exothermic calorific value ($\Delta H_{exo:2°\ C./min}$) and endothermic calorific value ($\Delta H_{endo:2°\ C./min}$) of the molding's foamed layer. When a small exothermic peak appears on the low temperature side of an endothermic peak as shown in FIG. 6, the exothermic calorific value ($\Delta H_{exo:2°\ C./min}$) of the molding's foamed layer is obtained from the sum of the area A of the first exothermic peak and the area B of the second exothermic peak in FIG. 6. That is, the area A is the area of a portion defined by the DSC curve and a straight line connecting a point "c" where the first exothermic peak begins to separate from the low temperature-side base line and a point "d" where the first exothermic peak returns to the high temperature-side base line. The area B is the area of a portion defined by the DSC curve and a straight line connecting a point "g" where the second exothermic peak begins to separate from the low temperature-side base line and an intersection "e" between the DSC curve and a straight line connecting the point "g" and a point "f" where the endothermic peak returns to the high temperature-side base line. Meanwhile, the endothermic calorific value ($\Delta H_{endo:2°\ C./min}$) of the foamed layer is a value obtained from the area of a portion defined by the DSC curve and a straight line connecting the points "e" and "f".

In the measurement of the above exothermic calorific value ($\Delta H_{exo:2°\ C./min}$) and the endothermic calorific value ($\Delta H_{endo:2°\ C./min}$), the reason that a heating rate of 2° C./min is employed as the measurement condition of the DSC curve is based on the knowledge of the inventor that a heating rate of 2° C./min is preferred to obtain an accurate endothermic calorific value ($\Delta H_{endo:2°\ C./min}$) and ($\Delta H_{endo:2°\ C./min} - \Delta H_{exo:2°\ C./min}$) by heat flux differential scanning calorimetry by separating the exothermic peak and the endothermic peak from each other as much as possible.

In Embodiment-I, the melt tension at 190° C. of the molding's foamed layer is 2 cN or more. When the melt tension is lower than 2 cN, it may be difficult to obtain a molding's foamed layer having a good appearance and excellent heat insulating properties. That is, the melt tension of the molding's foamed layer correlates closely with the melt tension of the cylindrical body's foamed layer in the foamed parison molding. The low melt tension of the molding's foamed layer means that the melt tension of the cylindrical body's foamed layer in a softened state is also low, and the drawdown of the foamed parison and the destruction of cells occur frequently in the cylindrical body's foamed layer having a low melt tension, thereby making it difficult to obtain a molding having excellent heat insulating properties. When the melt tension is 2 cN or more, the expansion ratio and thickness of the molding's foamed layer, the cell diameter and closed cell content can be adjusted to wide ranges. From this point of view, the melt tension of the molding's foamed layer is preferably 2 to 20 cN, more preferably 2 to 15 cN. The upper limit of the melt tension is not particularly limited but is generally 40 cN.

In the present invention, the melt tension is measured by using the Melt Tension Tester Model II, made by Toyo Seiki Seisakusho, Ltd. in accordance with the method described below. Stated more specifically, a melt tension tester having an orifice with an inner diameter of 2.095 mm and a length of 8 mm is used, the temperatures of the cylinder and the orifice are set to 190° C., a measurement sample which is a piece of the base resin or the molding's foamed layer is placed in the cylinder and left for 5 minutes, and the molten resin is extruded from the orifice into the form of a string under the conditions of a resin temperature of 190° C. and a piston speed of 10 mm/min. This string-shaped material is wrapped round a tension detection pulley having a diameter of 45 mm and take up by means of a take-up roller having a diameter of 50 mm while the take-up speed is gradually increased at a rate of 5 rpm/sec (take-up acceleration rate of the string: $1.3 \times 10^{-2}$ m/sec$^2$). When the molten resin is extruded from the orifice into the form of a string, care must be taken not to include bubbles in the string-shaped material as much as possible.

In the present invention, in order to obtain the melt tension, the take-up rate is increased until the string-shaped material on the tension detection pulley is broken to obtain a take-up rate R (rpm) at which the string is broken. Then, the take-up operation is repeated at a constant take-up rate of R×0.7 (rpm), during which the melt tension of the string, which is detected by means of a detector connected to the tension detection pulley, is measured as a function of time, followed by depiction of melt tension along the ordinate and the time along the abscissa, thus obtaining a graph having such amplitudes as shown in FIG. 7.

Figure 7:
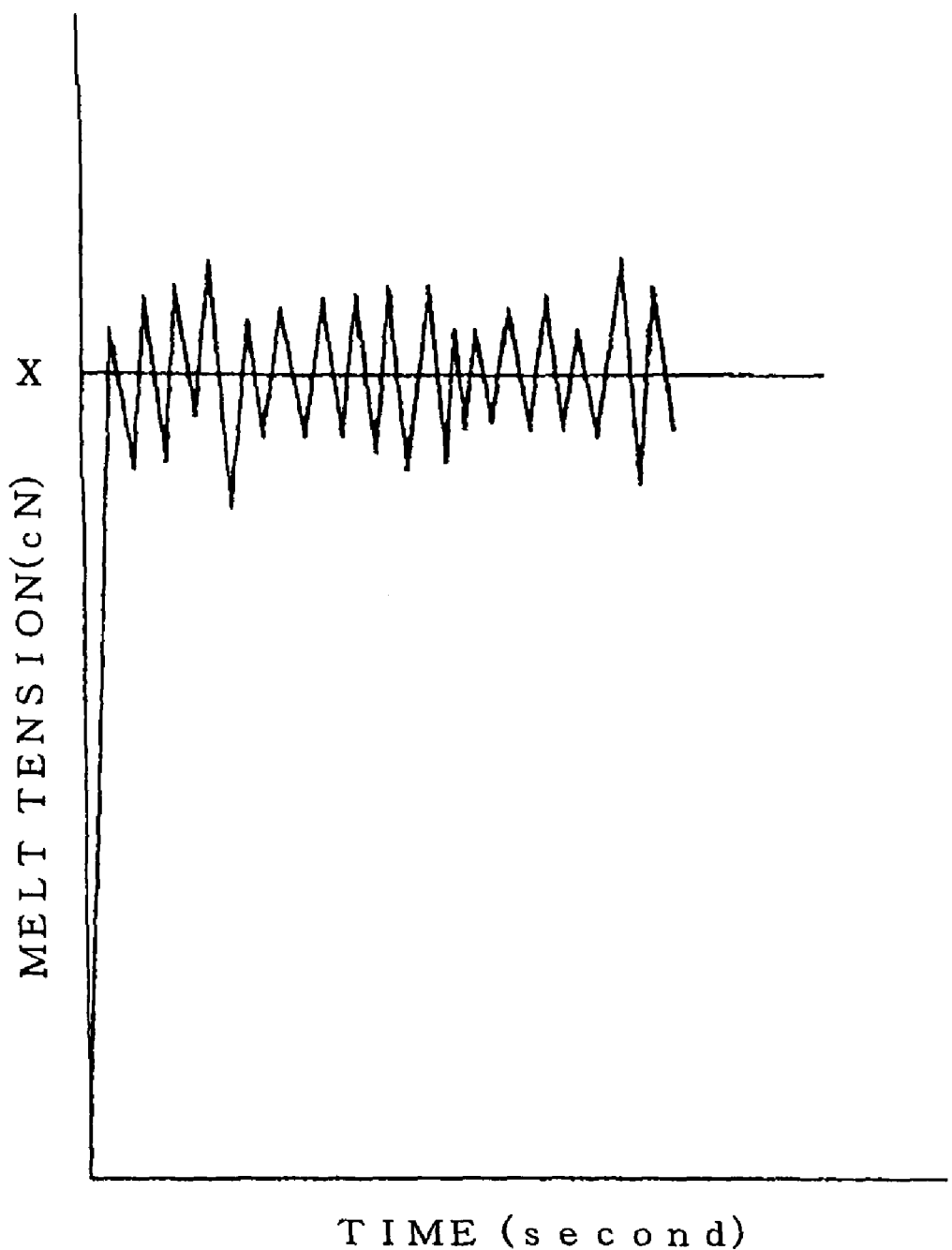
FIG. 7 is a graph for explaining a method of measuring the melt tension of a base resin or a molding's foamed layer.

In FIG. 7, the melt tension is determined as a median (X) of the amplitudes at a portion where the amplitudes become stable. It will be noted that where the string is not broken even when the take-up rate reaches 500 rpm, the melt tension of the string is obtained from the graph obtained by taking up the string at a take-up rate of 500 rpm. It will also be noted that a specific amplitude which unusually occurs in the time measurement of melt tension is neglected.

The melt flow rate (MFR) of the molding's foamed layer is preferably 0.1 to 10 g/10 min, more preferably 0.1 to 5 g/10 min, much more preferably 0.3 to 3 g/10 min because the molding's foamed layer has a good appearance and excellent physical properties as a foam.

The above MFR is obtained by measuring a foamed layer piece cut out from the molding's foamed layer as a sample in accordance with JIS K7210-197 A method under the test conditions of a temperature of 190° C. and a load of 21.2 N. When the molten resin is extruded from the orifice into the form of a string, care must be taken not to include bubbles in the string as much as possible.

As described above, the polylactic acid resin foamed molding in Embodiment-I is a foamed molding having excellent heat resistance and a good appearance because the molding's foamed layer constituting the molding has a difference ($\Delta H_{endo:2°\ C./min} - \Delta H_{exo:2°\ C./min}$) between the endothermic calorific value ($\Delta H_{endo:2°\ C./min}$) and the exothermic calorific value ($\Delta H_{exo:2°\ C./min}$) obtained by heat flux differential scanning calorimetry of 10/g or more and a melt tension at 190° C. of 2 cN or more (ii) Exothermic Calorific Value ($\Delta H_{exo:-10°\ C./min}$) Obtained by Heat Flux Differential Scanning Calorimetry at a Cooling Rate of 10° C./min Even in the foamed molding of the above Embodiment-I, the molding's formed layer has an exothermic calorific value ($\Delta H_{exo:-10°\ C./min}$) obtained by heat flux differential scanning calorimetry at a cooling rate of 10° C./min of preferably 20 J/g or more, more preferably 20 to 45 J/g, much more preferably 25 to 40 J/g, particularly preferably 30 to 38 J/g.

When the above exothermic calorific value ($\Delta H_{exo:-10°\ C./min}$) is 20 J/g or more as described above, the obtained foamed molding can be heat treated in a short period of time at the time of molding the obtained foamed molding or crystallizing it through a heat treatment in the subsequent step, thereby making it possible to manufacture a foamed molding having excellent rigidity and heat resistance at a high yield.

The upper limit of the exothermic calorific value ($\Delta H_{exo:-10° C./min}$) is not particularly limited but is generally 60 J/g.

In heat flux differential scanning calorimetry under the condition of a low cooling rate, e.g., a cooling rate of 2° C./min, the crystallization of even a molding's foamed layer comprising a base resin having a low crystallization rate is promoted by the above calorimetry, and a distinct exothermic peak is observed. In contrast to this, in heat flux differential scanning calorimetry under the condition of a high cooling rate, e.g., a cooling rate of 10° C./min, the crystallization of a molding's foamed layer comprising a base resin having a low crystallization rate is not promoted by the above calorimetry, and an exothermic peak is rarely observed or not observed at all. Or, the crystallization is rarely promoted and a distinct exothermic peak is not observed. In the heat flux differential scanning calorimetry of the molding's foamed layer, foamed parison molding is possible with a polylactic acid resin which is crystallized when the cooling rate is 2° C./min but is rarely crystallized or not crystallized at all when the cooling rate is 10° C./min. However, the time required for a heat treatment for improving heat resistance may be long. Therefore, as the crystallization of a polylactic acid resin having an exothermic calorific value ($\Delta H_{exo:-10° C./min}$) obtained by heat flux differential scanning calorimetry at a cooling rate of 10° C./min of 20 J/g or more proceeds quickly by a heat treatment, a foamed molding having excellent rigidity and heat resistance can be easily obtained at a high yield advantageously.

In the present invention, the exothermic calorific value ($\Delta H_{exo:-10° C./min}$) of the above molding's foamed layer is a value obtained by heat flux differential scanning calorimetry in accordance with JIS K7122-1987. 1 to 4 mg of a foam piece cut out from the molding's foamed layer is used as a sample, and the control of the state of the sample and the measurement of a DSC curve are carried out by the following procedures.

The sample is placed in the vessel of a DSC apparatus, heated to 200° C. to be molten, maintained at that temperature for 10 minuets, and cooled to 10° C. at a cooling rate of 10° C./min to obtain a DSC curve. The exothermic calorific value ($\Delta H_{exo:-10° C./min}$) of the foamed layer is a value obtained from the area of a portion defined by the DSC curve and a straight line connecting a point "h" where the exothermic peak of the DSC curve begins to separate from the high temperature-side base line and a point "i" where the exothermic peak returns to the low temperature-side base line. The apparatus is adjusted to make the base line as straight as possible. When the base line is inevitably curved, a point where the exothermic peak begins to separate from the curved base line on the high temperature side is taken as the point "h" and a point where the exothermic peak returns to the curved base line on the low temperature side is taken as the point "i".

(iii) Apparent Density

In Embodiment-I, the apparent density of the molding's foamed layer is preferably 0.03 to 0.8 g/cm$^3$.

When the apparent density is 0.03 g/cm$^3$ or more, the foamed layer becomes excellent in physical strength such as compressive strength and flexural strength and when the apparent density is 0.8 g/cm$^3$ or less, the foamed layer becomes excellent in heat insulating properties, soundproof properties and shock absorbing properties and light in weight as it can maintain a suitable expansion ratio. From this point of view, the apparent density is more preferably 0.06 to 0.7 g/cm$^3$, particularly preferably 0.08 to 0.63 g/cm$^3$.

The apparent density in the present invention is a value obtained by cutting out a sample from a portion relatively uniform in thickness and not excessively stretched during foamed parison molding of the foamed molding (in the case of a bottle-like foamed molding, a center portion on the side wall excluding the parting line), immersing it in water at 23° C. and dividing the weight of the sample by the volume of the sample obtained from a rise in the water level.

(iv) Closed Cell Content

In Embodiment-I, the closed cell content of the molding's foamed layer is preferably 50 to 100%, more preferably 70 to 100%, particularly preferably 80 to 100%. When the closed cell content falls within this range, the foamed layer becomes excellent in mechanical strength and heat insulating properties.

The closed cell content of the molding's foamed layer in this text is a value calculated from the true volume Vx of the sample measured by using the Air Comparison Type Densimeter Model 930 of Toshiba Beckman Co., Ltd. based on the following equation (1) in accordance with the procedure C specified in ASTM D2856-70 (re-authorized in 1976).

$$\text{Closed cell content (\%)}=(Vx-W/\rho)\times 100/(Va-W/\rho) \tag{1}$$

In the above equation (1), Vx is the true volume (cm$^3$) of the sample measured by the above method and equivalent to the sum of the volume of the resin constituting the sample and the total volume of cells in closed cell portions in the sample.

Va, W and $\rho$ in the above equation (1) represent the following.

Va: apparent volume (cm$^3$) of the sample calculated from the outer size of the sample W: total weight (g) of the sample $\rho$: density (g/cm$^3$) of the base resin constituting the sample As for the shape of the foamed molding of the present invention, hollow foamed moldings such as (1) a foamed molding having a space not communicating with the outside therein, (2) a foamed molding having a space communicating with the outside therein as shown in FIGS. 1(a) to 1(d) and (3) a cylindrical foamed molding are preferred. Examples of the foamed molding having a preferred shape include a bath-tub cover, a trunk lid and a heat and cold insulating container as (1), a heat insulating bottle as (2) and a duct as (3).

That is, the polylactic acid resin foamed molding of the present invention having a hollow portion therein has excellent effects that it is very light in weight without greatly reducing its mechanical strength and that it is a lightweight heat insulating cylindrical monolithic molding having a complex shape and therefore, the foamed molding can be favorably used in various applications such as auto parts and containers besides the above moldings.

The foamed molding of the present invention is not limited to a hollow foamed molding, and a foamed molding having no hollow portion nor space therein (solid polylactic acid resin foamed molding) as shown in FIG. 9(b) is also included in the scope of the present invention.

The average thickness of the molding's foamed layer in the present invention is preferably 1 to 15 mm from the viewpoints of mechanical properties and heat insulating properties when it is a cylindrical or hollow molding formed without fusion-bonding the inner wall of the foamed parison as shown in FIG. 9(a) in the foamed parison molding. The average thickness of the foamed layer of a foamed molding formed by fusion-bonding the inner wall of the foamed parison as shown in FIG. 9(b) becomes double apparently.

The above average thickness is obtained as follows. A portion relatively uniform in thickness and not stretched excessively during foamed parison molding (for example, a center portion on the side wall in the case of a bottle-like foamed molding) is selected from the foamed molding to obtain a vertical section of the foamed molding. Then, the thickness of the molding's foamed layer on the vertical section is measured at 10 points at equal intervals, and the arithmetic mean of the measurement values is taken as the average thickness of the molding's foamed layer.

(II) Process for Manufacturing a Polylactic Acid Resin Foamed Molding

A description is subsequently given of the process for manufacturing the polylactic acid resin foamed molding of the present invention.

Figure 8:
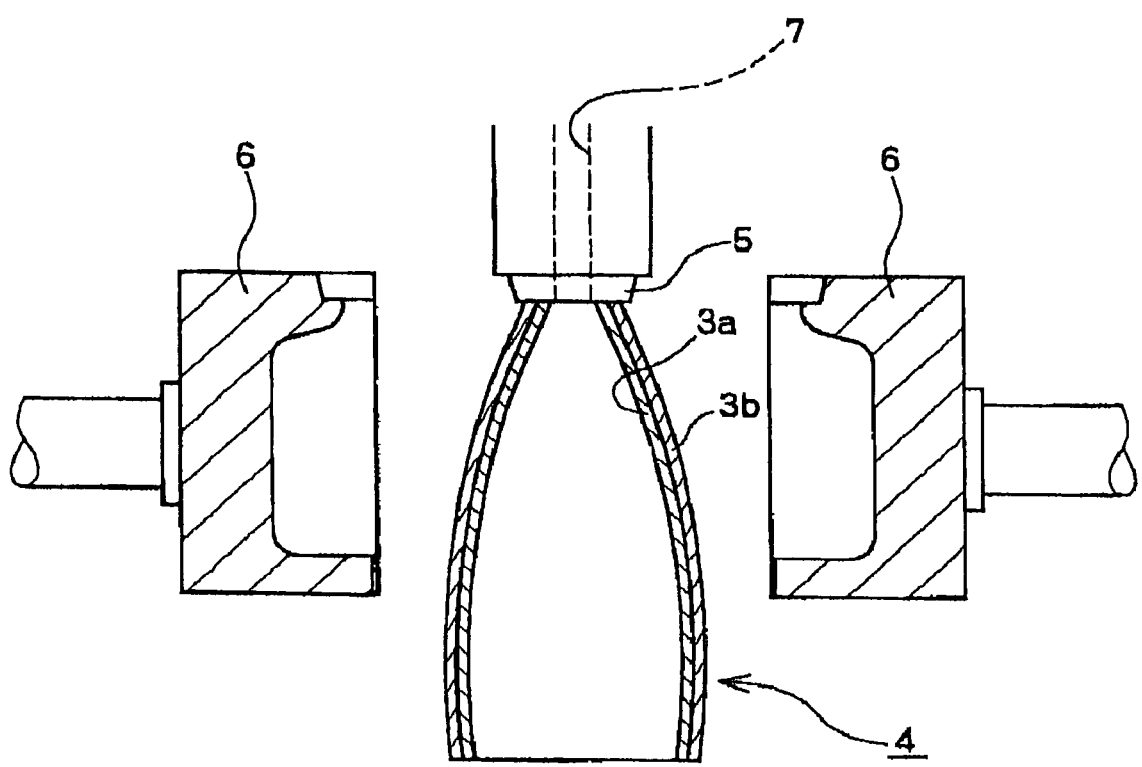
FIG. 8 is a diagram conceptually showing an example of a foam molding process for molding a foamed parison in the present invention by placing it in a mold and blowing a pressurized gas into said parison.

In the manufacturing process of the present invention, the above polylactic acid resin and a physical blowing agent are fed to an extruder to be heated and kneaded together so as to obtain a molten resin composition, and then the physical blowing agent is injected into the extruder to be kneaded with the molten resin composition so as to obtain a foamable molten resin composition. An accumulator is interposed between the extruder and a die as required to extrude the composition into a low-pressure zone from a ring-shaped die 5 so as to form a cylindrical body 4 having a cylindrical foamed layer 3a as shown in FIG. 8, and molds 6 and 6 are clamped together as shown in FIGS. 9(a) and 9(b) to position the cylindrical body 4 in a softened state within the molds 6 and 6 so as to manufacture a foamed molding. When a pressurized gas is blown into the inside of the cylindrical body 4 from a gas blowing port 7 as shown in FIG. 9(a) to such an extent that the cells of the cylindrical body's foamed layer are not destroyed at this point, foamed moldings having a hollow portion as (2) and (3) can be obtained. If the pressurized gas is not blown into the inside of the cylindrical body 4, a solid foamed molding or a foamed molding having a space not communicating with the outside therein as (1) can be obtained as shown in FIG. 9(b).

FIG. 8 and FIGS. 9(a) and 9(b) are diagrams conceptually showing an example of the manufacturing process of the present invention and the operation procedure of the manufacturing process of the present invention is not limited to the illustrated ones.

In FIG. 8 and FIGS. 9(a) and 9(b), 3a denotes the foamed layer and 3b a non-foamed thermoplastic resin layer.

(i) Embodiment-II

In the manufacturing process of Embodiment-II, the polylactic acid resin to be fed to the extruder has a melt tension at 190° C. of 3 cN or more, a water content of 300 ppm or less and an exothermic calorific value ($\Delta H_{exo:-10°\ C./min}$) obtained by heat flux differential scanning calorimetry (cooling rate of 10° C./min) of 20 J/g or more.

Further, the MFR of the polylactic acid resin is preferably 0.1 to 10 g/10 min.

The measurement methods of the above melt tension, the exothermic calorific value ($\Delta H_{exo:-10°\ C./min}$) obtained by heat flux differential scanning calorimetry at a cooling rate of 10° C./min and MFR are the same as those described in Embodiment-I.

When the melt tension of the polylactic acid resin used is 3 cN or more, the destruction of cells hardly occurs and the drawdown can be prevented at the time of obtaining the cylindrical body's foamed layer advantageously. From this point of view, the melt tension of the polylactic acid resin is preferably 5 to 40 cN, more preferably 7 to 30 cN. The upper limit of the melt tension is not particularly limited but is generally 40 cN.

Even when the melt tension of the polylactic acid resin used as a molding material is 3 cN or more, the polylactic acid resin is decomposed by shear stress or heat at the time of foam molding, whereby it is observed that the melt tension of the obtained molding's foamed layer becomes lower than that of the raw material polylactic acid resin. Therefore, to prevent a great reduction in the melt tension of the base resin, foam molding under the condition that heat higher than required and great shear are applied should be avoided. If the melt tension of the molding's foamed layer finally obtained by foam molding is kept at 2 cN or more, preferably 3 cN or more, particularly preferably 5 cN or more, foam molding conditions can be judged as satisfactory. As a result, a high-quality molding's foaming layer is formed.

When the water content of the polylactic acid resin is 300 ppm or less, the melt tension hardly drops during the foamed parison molding, thereby making it difficult to cause the drawdown of the cylindrical body 4 and easy to obtain a molding's foamed layer which can stand practical use. From this point of view, the water content of the polylactic acid resin is more preferably 200 ppm or less, more preferably 100 ppm or less, particularly preferably 50 ppm or less.

In this text, the measurement of the water content is carried out by using a Karl Fischer moisture micrometer. Stated more specifically, the polylactic acid resin is measured as a sample by Karl Fisher capacity titration in accordance with JIS K0068-2001.

The exothermic calorific value ($\Delta H_{exo:-10°\ C./min}$) obtained by heat flux differential scanning calorimetry at a cooling rate of 10° C./min of the polylactic acid resin used in Embodiment-II is 20 J/g or more, preferably 20 to 45 J/g, more preferably 25 to 40 J/g, particularly preferably 30 to 38 J/g. Since the exothermic calorific value ($\Delta H_{exo:-10°\ C./min}$) is 20 J/g or more, the drawdown at the time of molding the foamed parison can be suppressed, thereby improving the cell diameter, expansion ratio and thickness uniformity of the obtained molding's foamed layer. When the heat resistance of the obtained foamed molding is to be further improved by a heat treatment, the present invention has an effect that the heat treatment time can be shortened. The upper limit of the exothermic calorific value ($\Delta H_{exo:-10°\ C./min}$) is generally 60 J/g.

The MFR of the polylactic acid resin is preferably 0.1 to 10 g/10 min, more preferably 0.1 to 5 g/10 min, particularly preferably 0.3 to 3 g/10 min to improve foamability and prevent the drawdown of the foamed parison.

Preferably, the polylactic acid resin used in the process of the present invention has a melt tension at 190° C. of 3 cN or more and an MFR of 0.1 to 10 g/10 min as described above. To obtain this polylactic acid resin, the following processes are employed: one in which an organic peroxide is added to a polylactic acid resin having a melt tension of less than 3 cN (not including "0") and an MFR of 2 to 12 g/10 min to carry out a micro-crosslinking reaction (gel fraction is substantially 0%) so as to obtain a modified polylactic acid resin, and one in which the above polylactic acid resin is reacted with a polymerizing agent such as an isocyanate, epoxy compound, metal complex, polycarboxylic acid or mixture thereof to increase the molecular weight of the polylactic acid resin so as to obtain a modified polylactic acid resin which can be used in the manufacturing process of Embodiment-II.

In the process for obtaining the modified polylactic acid resin by using the above organic peroxide, the half-life-in-one-minute temperature (a fixed temperature at which the amount of active oxygen becomes half of the original in 1 minute when the organic peroxide is decomposed at the fixed temperature) of the used organic peroxide is desirably higher than a temperature 10° C. lower than the melting point of the polylactic acid resin to be modified. If the half-life-in-one-minute temperature is 10° C. or more lower than the melting point of the polylactic acid resin, the organic peroxide is decomposed or reacted before it and the polylactic acid resin are uniformly mixed together by heating and kneading, whereby the modification effect may become nonuniform. To obtain a satisfactory modification effect, the above organic peroxide must be added in a larger amount than an organic peroxide having a half-life-in-one-minute temperature higher than a temperature 10° C. lower than the melting point of the resin. As a result, a crosslinking reaction proceeds more than required in the subsequent extrusion foaming step to produce a large amount of gel in the molten resin, thereby making it difficult to obtain a satisfactory foamed molding.

Meanwhile, when the half-life-in-one-minute temperature of the organic peroxide is much higher than the melting point of the resin, the molecular weight of the resin is reduced by thermal decomposition because the modification reaction is carried out at a high temperature. As a result, the physical properties of the foamed molding may deteriorate, or a foamed molding may not be obtained. Therefore, it is desired that the half-life-in-one-minute temperature of the organic peroxide should not exceed a temperature 20° C. higher than the melting point of the polylactic acid resin.

The melting point of the polylactic acid resin in this text is obtained by heat flux differential scanning calorimetry in accordance with JIS K7121-1987. As for details of the measurement conditions, a sample whose state has been controlled under conditions as specified in JIS K7121-1987, Paragraph 3, Control of conditions of sample (2) (except that the cooling rate is 10° C./min) is used and heated at a rate of 10° C./min to obtain a melting peak, and the temperature at the top of the melting peak is taken as the melting point. When two or more melting peaks appear, the temperature at the top of a melting peak having the largest area is taken as the melting point.

The organic peroxide used for the modification of the polylactic acid resin is a conventionally known organic peroxide such as isobutyl peroxide [85° C.], cumyl peroxyneodecanoate [94° C.], α,α'-bis(neodecanoylperoxy)diisopropylbenzene (82° C.), di-n-propyl peroxydicarbonate [94° C.], diisopropyl peroxydicarbonate [88° C.], 1,-cyclohexyl-1-methylethyl peroxyneodecanoate [94° C.], 1,1,3,3-tetramethylbutyl peroxyneodecanoate [92° C.], bis(4-t-butylcyclohexyl) peroxydicarbonate [92° C.], di-2-ethoxyethyl peroxydicarbonate [92° C.], di(2-ethylhexylperoxy)dicarbonate [91° C.], t-hexylperoxyneodecanoate [101° C.], dimethoxybutyl peroxydicarbonate [102° C.], di(3-methyl-3-methoxybutylperoxy)dicarbonate [103° C.], t-butylperoxyneodecanoate [104° C.], 2,4-dichlorobenzoyl peroxide [119° C.], t-hexylperoxypyvarate [109° C.], t-butylperoxypyvarate [110° C.], 3,5,5-trimethylhexanoyl peroxide [113° C.], octanoyl peroxide [117° C.], lauroyl peroxide [116° C.], stearoyl peroxide [117° C.], 1,1,3,3-tetramethylbutylperoxy 2-ethylhexanoate [124° C.], succinic peroxide [132° C.], 2,5-dimethyl-2,5-di(2-ethyhexanoylperoxy)hexane [119° C.], 1-cyclohexyl-1-methylethylperoxy-2-ethylhexanoate [138° C.], t-hexylperoxy-2-ethylhexanoate [133° C.], t-butylperoxy-2-ethylhexanoate [134° C.], m-toluoylbenzoyl peroxide [131° C.], benzoyl peroxide [130° C.], t-butylperoxyisobutyrate [136° C.], 1,1-bis(t-butylperoxy)-2-methylcyclohexane [142° C.], 1,1-bis(t-hexylperoxy)-3,3,5-trimethylcyclohexane [147° C.], 1,1-bis(t-hexylperoxy)cyclohexane [149° C.], 1,1-bis(t-butylperoxy)-3,3,5-trimethylcyclohexane [149° C.], 1,1-bis(t-butylperoxy)cyclohexane [154° C.], 2,2-bis(4,4-dibutylperoxycyclohexyl)propane [154° C.], 1,1-bis(t-butylperoxy)cyclododecane [153° C.], t-hexylperoxyisopropyl monocarbonate [155° C.], t-butylperoxymaleic acid [168° C.], t-butyperoxy-3,5,5-trimethylhexanoate [166° C.], t-butylperoxylaurate [159° C.], 2,5-dimethyl-2,5-di(m-toluoylperoxy)hexane [156° C.], t-butylperoxyisopropyl monocarbonate [159° C.], t-butylperoxy-2-ethylhexyl monocarbonate [161° C.], t-hexylperoxybenzoate [160° C.], 2,5-dimethyl-2,5-di(benzoylperoxy)hexane [158° C.] or dicumyl peroxide [175° C.]. Among the above organic peroxides, dicumyl peroxide is particularly preferred. The temperatures within the parentheses after the names of the organic peroxides indicate the half-life-in-one-minute temperatures of the organic peroxides. The above organic peroxides may be used alone or in combination of two or more. The organic peroxide is added in an amount of generally 0.3 to 0.7 part by weight, preferably 0.4 to 0.6 part by weight based on 100 parts by weight of the base resin.

In this text, the half-life-in-one-minute temperature of the organic peroxide is measured by preparing an organic peroxide solution having a concentration of 0.1 mol/liter using a relatively inactive solution (such as benzene or mineral spirit) to a radical, sealing it in a glass tube whose inside has been substituted by nitrogen, immersing the glass tube in a thermostatic oven set to a predetermined temperature and thermally decomposing the organic peroxide.

The gel fraction of the polylactic acid resin modified as described above is substantially 0%.

In this text, the gel fraction is obtained as follows.

A sample having a weight W1 prepared by accurately weighing about 1 g of a polylactic acid resin and 100 ml of chloroform are charged into a 150 ml flask and heated and refluxed in the chloroform boiled at about 61° C. for 10 hours, and the obtained heat treated product is filtered with a suction filtration device having a 100 mesh wire net. The obtained filtrate on the wire net is dried in an oven heated at 20° C. under a reduced pressure of 30 to 40 Torr for 24 hours. The weight W2 of the obtained dried product is measured. The weight percentage of the weight W2 to the weight W1 [(W2/W1)×100] (%) is taken as the gel fraction.

A gel fraction of substantially 0% in the present invention means that the gel fraction of a polymer obtained from the above expression is 2% or less, preferably 0.5% or less.

According to the manufacturing process of Embodiment-II, by carrying out the foamed parison molding using a polylactic acid resin having a melt tension at 190° C. of 3 cN or more, a water content of 300 ppm or less and an exothermic calorific value ($\Delta H_{exo:-10°\ C./min}$) of 20 J/g or more, a polylactic acid resin foamed molding having a molding's foamed layer with a satisfactory cell state and excellent heat insulating properties and mechanical strength can be manufactured. The obtained molding's foamed layer can have high heat resistance when it is subjected to a heat treatment.

(ii) Embodiment-III

The process for manufacturing a polylactic acid resin foamed molding of Embodiment-III comprises the steps of feeding 100 parts by weight of a polylactic acid resin having a water content of 300 ppm or less (including "0") and an endothermic calorific value ($\Delta H_{endo:row}$) obtained by heat flux differential scanning calorimetry (heating rate of 2°

C./min) of 10 J/g or more and 0.1 to 1 part by weight of an organic peroxide to an extruder to heat and knead them together so as to obtain a molten resin composition, injecting a physical blowing agent into the extruder to knead it with the molten resin composition so as to obtain a foamable molten resin composition, extruding the resin composition from a die into a low-pressure zone to form a cylindrical body having a foamed layer, and placing the cylindrical body in a mold and molding it.

In the manufacturing process of Embodiment-III, in place of the polylactic acid resin having a melt tension at 190° C. of 3 cN or more, a water content of 300 ppm or less and a specific exothermic calorific value ($\Delta H_{exo:-10° C./min}$) of 20 J/g or more specified in Embodiment-II, a polylactic acid resin having a water content of 300 ppm or less and an endothermic calorific value ($\Delta H_{endo:row}$) obtained by heat flux differential scanning calorimetry (heating rate of 2° C./min) of 10 J/g or more and 0.1 to 1 part by weight based on 100 parts by weight of the polylactic acid resin of an organic peroxide are fed to the extruder to form a cylindrical body having a foamed layer.

The measurement of the endothermic calorific value ($\Delta H_{endo:row}$) is described above.

As the peroxide may be used peroxides enumerated in Embodiment-II. Among these, dicumyl peroxide is preferred and the amount of the peroxide is 0.1 to 1.0 part by weight based on 100 parts by weight of the polylactic acid resin. By carrying out the foamed parison molding using the polylactic acid resin and a specific amount of the organic peroxide, even if the polylactic acid resin has a low melt tension, the polylactic acid resin is modified in the extruder to improve its melt tension regardless of the melt tension of the polylactic acid resin, thereby making it possible to manufacture a polylactic acid resin foamed molding having a molding's foamed layer with excellent heat insulating properties and mechanical strength. Further, though the reason is unknown, the obtained molding's foamed layer has a high crystallization rate and can have high heat resistance when it is subjected to a short time of a heat treatment. The above manufacturing process has an excellent effect that it makes it easy to use the recovered polylactic acid resin as a raw material.

According to the manufacturing process of Embodiment-III, by carrying out the foamed parison molding using a polylactic acid resin having a water content of 300 ppm or less and an endothermic calorific value ($\Delta H_{endo:row}$) of 10 J/g or more and a specific amount of an organic peroxide, a polylactic acid resin foamed molding having a molding's foamed layer with excellent heat insulating properties and mechanical strength can be manufactured regardless of the melt tension of the polylactic acid resin even if the polylactic acid resin has a low melt tension and it is easy to use the recovered polylactic acid resin as a raw material. Further, the obtained molding's foamed layer has a high crystallization rate and can have high heat resistance when it is subjected to a short time of a heat treatment.

(iii) Additives

In the manufacturing process of the present invention, in order to obtain a low apparent density, as the blowing agent for foaming the polylactic acid resin is used a physical blowing agent selected from aliphatic hydrocarbons such as lower alkanes including propane, normal butane, isobutane, normal pentane, isopentane and hexane, alicyclic hydrocarbons such as cyclopentane and cyclohexane, halogenated aliphatic hydrocarbons such as methyl chloride and ethyl chloride, and inorganic gases such as carbon dioxide. Among these, normal butane, isobutane and carbon dioxide ($CO_2$) are preferred because they easily foam the polylactic acid resin, and carbon dioxide is more preferred from the viewpoint of an influence upon environment. More specifically, a physical blowing agent comprising 50 to 100 mol % of carbon dioxide is preferred. The carbon dioxide has the effect of shortening the cooling time at the time of molding the foamed parison, the effect of enhancing safety at the time of manufacture, the effect of providing flame retardancy easily because a combustible gas is not contained in the molding and the effect of obtaining a molding having excellent dimensional stability and mechanical strength.

As the blowing agent for foaming the polylactic acid resin may be used a chemical blowing agent or a combination of a physical blowing agent and a chemical blowing agent besides the above physical blowing agents. In order to obtain a molding's foamed layer having a low apparent density, it is preferred to use a physical blowing agent or a combination of a physical blowing agent and a chemical blowing agent as the blowing agent.

To foam the polylactic acid resin, an inorganic foam controlling agent such as talc or silica or an organic foam controlling agent such as calcium stearate is added. Additives such as a colorant and an antioxidant may be added to the base resin according to an application purpose.

(iv) Molding of Foamable Form

In the manufacturing process of the present invention, preferably, the cylindrical body 4 consists of a cylindrical foamed layer 3a and a non-foamed thermoplastic resin layer 3b as shown in FIG. 8. In this case, as described above, a plate-like foamed molding covered with a thermoplastic resin layer or a foamed molding which has a hollow portion therein and is covered with a thermoplastic resin layer on the exterior side and/or interior side can be obtained.

To obtain a foamed molding covered with an non-foamed thermoplastic resin layer, a thermoplastic resin is fed to an extruder different from the extruder for forming a foamable molten resin composition to be heated and kneaded so as to prepare a molten resin composition for forming a resin layer, the molten resin composition is supplied into the above ring-shaped die 5 as shown in FIG. 8, the molten resin composition for forming a resin layer is joined to the outer side and/or inner side of a tubular passage for the above foamable molten resin composition in the ring-shaped die 5 or near the outlet, and these compositions are extruded from the ring-shaped die 5 into the low-pressure zone.

In the above foam molding, well-known foam molding for general-purpose thermoplastic resins (for example, U.S. Pat. No. 4,874,649, U.S. Pat. No. 6,432,525, U.S. Pat. No. 6,875,484, EP-A-1057608, UA-A-2004-0062885, JP-A-2000-33643, JP-A-2000-334759, JP-A-2001-18283, JP-A-2001-47537, JP-A-2001-47539, JP-A-2001-179805, JP-A-2002-192601, JP-A-2003-39536, JP-A-2003-236918, JP-A-2004-82332, JP-A-2004-116956, JP-A-2004-116959, JP-A-2004-122488, JP-A-2004-122691, JP-A-2004-249680) can be employed.

Examples of the resin used in the above thermoplastic resin layer 3b include polyolefin resins, polyester resins, polystyrene resins, polyamide resins such as nylon-6 and nylon 6,6, poly(meth)acrylic resins such as polymethyl methacrylate and polyacrylate, polycarbonate resins and mixtures thereof.

The above polyolefin resins include low-density polyethylene, high-density polyethylene-based resin, linear low-density polyethylene, ethylene-butene block copolymer, ethylene-butene random copolymer, ethylene-vinyl acetate copolymer, ethylene-methyl methacrylate copolymer, ethylenic ionomer resins obtained by crosslinking the space between the molecules of the ethylene-methacrylic acid copolymer with metal ions, and polypropylene resins. The polypropylene resins include a propylene homopolymer, propylene-ethylene copolymer, propylene-butene copolymer and propylene-ethylene-buteneterpolymer. Graft modified polyolefin resins obtained by impregnating the above polyolefin resins with a vinyl monomer such as styrene to graft polymerize them may also be used.

The above polystyrene resins include polystyrene, high-impact polystyrene (HIPS) and styrene-based elastomers.

The above polyester resins include aliphatic polyesters, aliphatic aromatic polyesters and aromatic polyesters.

The above aliphatic polyesters include biodegradable aliphatic polyesters such as polybutylene succinate, polybutylene adipate and polybutylene succinate adipate all of which are chemically synthesized from glycol and an aliphatic dicarboxylic acid, and polylactic acid resins.

As heat treatment conditions for the foamed molding of the present invention, for example, during the molding of the foamed parison, the temperature of the mold is set to preferably 80 to 130° C., more preferably 90 to 120° C., and the foamed molding is kept in the mold for preferably 10 to 90 seconds, more preferably 10 to 60 seconds. Besides the above method, the foamed molding taken out from the mold after molding is desirably heat treated at about 60 to 80° C. which is higher than the glass transition temperature of the polylactic acid resin for preferably 0.5 hour or more, more preferably 1 hour or more. There is no upper limit of the heat treating time in this case but it is generally 36 hours or less from the viewpoint of productivity. The heat resistance and rigidity of the foamed molding can be improved by the above heat treatment. When the temperature of the heat treatment for the promotion of crystallization is too low, it may take long to crystallize the foamed molding, thereby reducing productivity. When the temperature is too high, it may become difficult to crystallize the foamed molding completely and also the strength of the foamed molding may become low.

The foamed molding of the present invention is preferably used as a duct for air conditioners or a trunk lid.

EXAMPLES

The following examples and comparative examples are provided to further illustrate the present invention.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

In the following examples and comparative examples, polylactic acid resins A, B, C and D were used.

The polylactic acid resins A and B were manufactured by using a double-screw extruder having an inner diameter of 47 mm as follows.

100 parts by weight of the H-100 crystalline polylactic acid resin manufactured by Mitsui Chemical Co., Ltd. (density: 1,260 kg/m$^3$, endothermic calorific value ($\Delta H_{endo:row}$) : 49 J/g) and a specific amount shown in Table 1 of a peroxide (DCP: dicumyl peroxide) were fed to the double-screw extruder and heated at a temperature at which the resin melted completely to be melt kneaded together, the resin temperature was adjusted to 215° C., and the resulting melt was then extruded into the form of a strand. The strand-shaped extruded product was immersed in water at about 25° C. to be cooled and cut into pellets to obtain polylactic acid resins A and B. The melt tensions of the polylactic acid resins A and B are shown in Table 1.

The H-100 crystalline polylactic acid resin of Mitsui Chemical Co., Ltd. was used as the polylactic acid resin C. The melt tension of the polylactic acid resin C is shown in Table 1.

The H-280 noncrystalline polylactic acid resin of Mitsui Chemical Co., Ltd. was used as the polylactic acid resin D. The melt tension of the polylactic acid resin D is shown in Table 1.

In Examples and Comparative Examples, the physical properties of a sample were measured by the above-described measurement methods.

TABLE 1

| | | Name of resin | | | |
|---|---|---|---|---|---|
| | | resin A | resin B | resin C | resin D |
| Polylactic acid resin | | H-100 | H-100 | H-100 | H-280 |
| Peroxide | type | DCP | DCP | — | — |
| | parts by weight*[1] | 0.4 | 0.6 | — | — |
| Melt tension | cN | 16 | 27 | 0.4 | 1.0 |

*[1]based on 100 parts by weight of the polylactic acid resin

Examples 1 to 8 and Comparative Examples 1 to 4

Talc was added as a foam controlling agent to 100 parts by weight of a base resin shown in Tables 2 to 4 in an amount shown in Tables 2 to 4 and fed to an extruder having an inner diameter of 65 mm to be melt kneaded with the base resin so as to prepare a molten resin composition, and then a physical blowing agent shown in Tables 2 to 4 was injected into the extruder in an amount shown in Tables 2 to 4 to be kneaded with the molten resin composition so as to obtain a foamable molten resin composition which was then charged into an accumulator.

Thereafter, the foamable molten resin composition was extruded from a ring-shaped die installed at the exit of the accumulator into the air at a resin temperature and an instantaneous discharge rate shown in Tables 2 to 4 to be foamed so as to form a cylindrical body.

The outlet of the ring-shaped die had a ring-shaped clearance having an external diameter of 90 mm and a clearance gap of about 0.8 mm at the time of extruding the foamable molten resin composition, and the foamable molten resin composition was extruded into the air from the clearance.

Then, when the obtained cylindrical body was placed in a two-piece mold positioned right below the die, the mold was clamped, and a pressurized gas (air) having a pressure of 0.4 g/cm$^2$ was blown into the inside of the cylindrical body to carry out molding, a good molding having a hollow portion and consisting of a foamed layer alone was obtained. A hollow duct-like mold was used as the mold.

In all Examples excluding Example 7, hollow duct-like moldings having an elliptic section with a long outer diameter of 150 mm and a short outer diameter of 70 mm and a length of 650 mm were manufactured. In Example 7, a hollow board-like molding having a length of 40 mm, a width of 250 mm and a thickness of 400 mm was manufactured. The thickness of each foamed layer in Examples is shown in the column of average thickness in Tables 2 to 4.

After the molding was taken out from the mold, it was heated in an oven set to a temperature shown in Tables 2 to 4 for a time shown in Tables 2 to 4 as heat treatment conditions.

For reference, ($\Delta H_{exo:-2°\ C./min}$) and ($\Delta H_{exo:-10°\ C./min}$) measured for the polylactic acid resin used in foam molding are shown in upper parts of Tables 2 to 4.

The physical properties of the obtained foamed moldings are shown in Tables 2 to 4. DSC measurement data shown in Tables 2 to 4 were obtained by measuring with the DSC-50 differential scanning calorimeter of Shimadzu Corporation and analyzing with the TA-60WS thermoanalysis workstation of Shimadzu Corporation and a personal computer having Windows XP Home of Microsoft Co., Ltd. The software used for the above analysis was TA60 Ver. 1.52 (including partial area analysis program).

TABLE 2

|  |  |  | Example 1 | Example 2 | Example 3 | Example 4 |
|---|---|---|---|---|---|---|
| Manufacturing conditions | Base resin (weight ratio) | — | A | B | A/D (8/2) | A |
|  | $\Delta H_{exo}$: −2° C./min | J/g | 39.0 | 38.5 | 31.0 | 39.0 |
|  | $\Delta H_{exo}$: −10° C./min | J/g | 33.8 | 34.3 | 27.6 | 33.8 |
|  | Blowing agent (molar ratio) | — | $CO_2$ | $CO_2$ | $CO_2$ | $CO_2$/Bu (8/2) |
|  | Amount of blowing agent | weight %*1 | 1.0 | 1.5 | 0.7 | 1.3 |
|  | Foam controlling agent | — | talc | talc | calcium carbonate | talc |
|  | Amount of foam controlling agent | parts by weight*2 | 0.2 | 0.1 | 0.5 | 2.0 |
|  | Melt tension | cN | 16 | 27 | 13 | 16 |
|  | Water content | ppm | 50 | 30 | 50 | 50 |
|  | Resin temperature | ° C. | 166 | 161 | 166 | 164 |
|  | Instantaneous discharge rate | kg/hr | 275 | 350 | 250 | 275 |
| Physical properties of foamed molding | Shape | — | duct-like | duct-like | duct-like | duct-like |
|  | Apparent density | g/cm³ | 0.24 | 0.13 | 0.42 | 0.18 |
|  | Average thickness | mm | 3.0 | 5.2 | 2.0 | 4.8 |
|  | Closed cell content | % | 75 | 65 | 82 | 70 |
|  | $\Delta H_{exo}$: 2° C./min | J/g | 0 | 0 | 12.8 | 15.2 |
|  | $\Delta H_{endo}$: 2° C./min | J/g | 39.4 | 39.2 | 31.0 | 39.0 |
|  | $\Delta H_{endo}$: 2° C./min − $\Delta H_{exo}$: 2° C./min | J/g | 39.4 | 39.2 | 18.2 | 23.8 |
|  | $\Delta H_{exo}$: −10° C./min | J/g | 35.0 | 35.0 | 28.0 | 37.0 |
|  | Melt tension of foamed layer | cN | 3 | 8 | 3 | 4 |
|  | Appearance | — | ○ | ○ | ○ | ○ |
|  | Heat treatment conditions | temperature ° C. | 70 | 70 | 70 | 70 |
|  |  | time min | 60 | 60 | 30 | 30 |
|  | Heat resistance | — | ○ | ○ | ○ | ○ |

*1% by weight of resin composition including the polylactic acid resin, the blowing agent and all other additives.
*2based on 100 parts by weight of the polylactic acid resin

TABLE 3

|  |  |  | Example 5 | Example 6 | Example 7 | Example 8 |
|---|---|---|---|---|---|---|
| Manufacturing conditions | Base resin (weight ratio) | — | C*3 | A | A | A |
|  | $\Delta H_{exo}$: −2° C./min | J/g | 34.2 | 39.0 | 39.0 | 39.0 |
|  | $\Delta H_{exo}$: −10° C./min | J/g | 0 | 33.8 | 33.8 | 33.8 |
|  | Blowing agent (molar ratio) | — | $CO_2$ | $CO_2$/Bu (2/8) | $CO_2$ | $CO_2$ |
|  | Amount of blowing agent | weight%*1 | 1.0 | 2.5 | 1.2 | 1.0 |
|  | Foam controlling agent | — | talc | talc | talc | talc |
|  | Amount of foam controlling agent | parts by weight*2 | 1.0 | 0.1 | 0.2 | 0.2 |
|  | Melt tension | cN | 0.4 | 16 | 16 | 16 |
|  | Water content | ppm | 50 | 50 | 50 | 50 |
|  | Resin temperature | °C. | 166 | 159 | 166 | 166 |
|  | Instantaneous discharge rate | kg/hr | 275 | 500 | 275 | 275 |
| Physical properties of foamed molding | Shape | — | duct-like | duct-like | board-like | duct-like |
|  | Apparent density | g/cm³ | 0.24 | 0.06 | 0.18 | 0.24 |
|  | Average thickness | mm | 3.0 | 7.5 | 10.0 | 3.0 |
|  | Closed cell content | % | 78 | 50 | 50 | 75 |
|  | $\Delta H_{exo}$: 2° C./min | J/g | 0 | 0 | 0 | 0 |
|  | $\Delta H_{endo}$: 2° C./min | J/g | 38.5 | 39.2 | 38.8 | 37.2 |
|  | $\Delta H_{endo}$: 2° C./min − $\Delta H_{exo}$: 2° C./min | J/g | 38.5 | 39.2 | 38.8 | 37.2 |
|  | $\Delta H_{exo}$: −10° C./min | J/g | 35.2 | 35.0 | 35.3 | 35.0 |
|  | Melt tension of foamed layer | cN | 5 | 5 | 3 | 3 |
|  | Appearance | — | ○ | ○ | ○ | ○ |

TABLE 3-continued

|  |  |  | Example 5 | Example 6 | Example 7 | Example 8 |
|---|---|---|---|---|---|---|
| Heat treatment conditions | temperature | ° C. | 80 | 70 | 70 | 110 |
|  | time | min | 30 | 60 | 60 | 0.5 |
| Heat resistance |  | — | ○ | ○ | ○ | ○ |

*[1] and *[2] Same as noted above.
*[3] DCP 0.4 weight % added

TABLE 4

|  |  |  | Comparative Example 1 | Comparative Example 2 | Comparative Example 3 | Comparative Example 4 |
|---|---|---|---|---|---|---|
| Manufacturing conditions | Base resin (weight ratio) | — | C | D | A | B/D (3/7) |
|  | $\Delta H_{exo}$: $-2°$ C./min | J/g | 34.2 | 0 | 39.0 | 7.8 |
|  | $\Delta H_{exo}$: $-10°$ C./min | J/g | 0 | 0 | 33.8 | 7.0 |
|  | Blowing agent (molar ratio) | — | $CO_2$ | $CO_2$ | $CO_2$ | $CO_2$ |
|  | Amount of blowing agent | weight %*[1] | 1.0 | 1.0 | 1.0 | 0.7 |
|  | Foam controlling agent | — | talc | talc | talc | talc |
|  | Amount of foam controlling agent | part by weight*[2] | 0.2 | 0.2 | 0.2 | 0.5 |
|  | Melt tension | cN | 0.4 | 1.0 | 16 | 9 |
|  | Water content | ppm | 50 | 50 | 2000 | 50 |
|  | Resin temperature | ° C. | 166 | 166 | 166 | 161 |
|  | Instantaneous discharge rate | kg/hr | 275 | 275 | 275 | 350 |
| Physical properties of foamed molding | Shape | — | duct-like | duct-like | duct-like | duct-like |
|  | Apparent density | g/cm³ | 1.05 | 0.24 | 0.97 | 0.42 |
|  | Average thickness | mm | 1.3 | 3.0 | 1.5 | 1.8 |
|  | Closed cell content | % | 2 | 82 | 6 | 78 |
|  | $\Delta H_{exo}$: $2°$ C./min | J/g | 33.2 | 0 | 0 | 0 |
|  | $\Delta H_{endo}$: $2°$ C./min | J/g | 33.9 | 0 | 39.4 | 8.3 |
|  | $\Delta H_{endo}$: $2°$ C./min − $\Delta H_{exo}$: $2°$ C./min | J/g | 0.7 | 0 | 39.4 | 8.3 |
|  | $\Delta H_{exo}$: $-10°$ C./min | J/g | 1.0 | 0 | 35.0 | 7.4 |
|  | Melt tension of foamed layer | cN | 0.2 | 0.6 | 0.1 | 2.5 |
|  | Appearance | — | X | ○ | X | ○ |
|  | Heat treatment conditons | temperature | ° C. | 70 | 70 | 70 | 70 |
|  |  | time | min | 120 | 120 | 60 | 120 |
|  | Heat resistance | — | X | X | ○ | X |

*[1] and *[2] Same as noted above.

The evaluations of appearance and heat resistance in Tables 2 to 4 were carried out based on the following criteria. Evaluation of appearance ○: almost uniform in the cell diameter and cell shape of the foamed molding and also uniform in surface gloss x : large irregularities existent on the surface of the foamed molding and not uniform in cell diameter and cell shape Evaluation of Heat Resistance The obtained foamed molding was heated in an oven for 5 minutes to compare the shape of the molding before and after heating so as to check deformation, and the heat resistance of the foamed molding was evaluated based on the following criteria.

⊚: not deformed up to 90° C.

○: not deformed up to 70° C.

x: greatly deformed up to 70° C.

Since a crystalline polylactic acid resin having a melt tension of 0.4 cN was used in Comparative Example 1, a foamed molding having a good appearance could not be obtained.

Since a noncrystalline polylactic acid resin was used in Comparative Example 2, a foamed molding having a good appearance could be obtained regardless of the melt tension of the polylactic acid resin but it was inferior in heat resistance.

Since a polylactic acid resin having a water content of 2,000 ppm was used in Comparative Example 3, a foamed molding having a good appearance could not be obtained.

Since ($\Delta H_{endo:2° C./min} - \Delta H_{exo:2° C./min}$) of the molding's foamed layer was less than 10 J/g in Comparative Example 4, a foamed molding having excellent heat resistance could not be obtained.

What is claimed is:

1. A polylactic acid resin blow-molded foam obtained by placing in a mold a foamed parison having a foamed layer, which is formed by extruding a foamable molten resin composition prepared by kneading together a polylactic acid resin and a physical blowing agent from a die into a low-pressure zone, and blow-molding it, wherein the polylactic acid resin constituting a molding's foamed layer is modified with an organic peroxide or a polymerizing agent selected from an isocyanate, epoxy compound, metal complex, polycarboxylic acid and mixture thereof, and, the molding's foamed layer constituting the foamed molding has a difference ($\Delta H_{endo:2° C./min} - \Delta H_{exo:2° C./min}$) between an endothermic calorific value ($\Delta H_{endo:2° C./min}$) and an exothermic calorific value ($\Delta H_{exo:2° C./min}$) obtained by heat flux differential scanning calorimetry at a heating rate of 2° C./min, of 10 J/g or more, an exothermic calorific value ($\Delta H_{exo:-10° C./min}$) obtained by heat flux differential scanning calorimetry at a cooling rate of 10° C./min, of 25 to 40 J/g, a melt tension at 190° C. of 2-15 cN, an apparent density of 0.03 to 0.42 g/cm$^3$, an average thickness of 1 to 15 mm, and a closed cell content of 50 to 100%.

2. The polylactic acid resin blow-molded foam according to claim 1 which has a hollow portion therein.

3. The polylactic acid resin blow-molded foam according to claim 1, wherein the polylactic acid resin constituting the molding's foamed layer is modified with an organic peroxide.

* * * * *